May 5, 1970 P. G. BARTLETT ET AL 3,510,852

FERROELECTRIC STORAGE CAPACITOR MATRICES

Filed Dec. 28, 1967 3 Sheets-Sheet 1

INVENTORS.
PETER G. BARTLETT &
JOSEPH E. MESCHI
BY
Meyer, Tilberry & Body
ATTORNEYS

FERROELECTRIC STORAGE CAPACITOR MATRICES

Filed Dec. 28, 1967 3 Sheets-Sheet 2

INVENTORS.
PETER G. BARTLETT &
JOSEPH E. MESCHI
BY
*Meyer, Tilberry & Body*
ATTORNEYS

FERROELECTRIC STORAGE CAPACITOR MATRICES

Filed Dec. 28, 1967 3 Sheets-Sheet 3

INVENTORS.
PETER G. BARTLETT &
JOSEPH E. MESCHI
BY
Meyer, Tilberry & Body
ATTORNEYS United States Patent Office 3,510,852
Patented May 5, 1970

3,510,852

FERROELECTRIC STORAGE CAPACITOR MATRICES

Peter G. Bartlett, Davenport, Iowa, and Joseph E. Meschi, Lyons, Ill., assignors to E. W. Bliss Company, Canton, Ohio, a corporation of Delaware Filed Dec. 29, 1967, Ser. No. 694,596
Int. Cl. G11c 11/22
U.S. Cl. 340—173.2 12 Claims

ABSTRACT OF THE DISCLOSURE

Both apparatus and method are disclosed herein for applying binary signals to a ferroelectric storage capacitor matrix. Voltage levels of various values are applied to opposing surfaces of each memory means in a matrix. The values of these voltages are dependent upon the polarization potential required to polarize a memory means.

This invention relates to the art of ferroelectric storage capacitors and, more particularly, to improvements for applying binary signals for storage in a ferroelectric capacitor matrix. Also, this invention relates to improvements upon the ferroelectric structures disclosed in application, Ser. No. 523,223, now Pat. No. 3,385,181 filed Feb. 14, 1966, and application, Ser. No. 640,717, now Pat. No. 3,401,377 filed May 23, 1967, both assigned to the same assignee as the present invention, and which applications are herein incorporated by reference.

In recent years, attention has been directed toward utilizing ceramic materials in the computer field. In particular, attention has been directed toward utilizing the electrostrictive, piezoelectric and ferroelectric characteristics found in many of these materials. Ferroelectric storage devices, or capacitors, comprise dielectric materials which depend upon internal polarization rather than upon surface charge for storage of information. A number of such materials are known, such as barium titanate, Rochelle salt, lead metaniobiate and lead titanate zirconate composition. These materials may be prepared in the form of single crystals or ceramics, upon which conductive coatings may be applied to provide terminals. Ferroelectric capacitors exhibit two stable states of polarization, somewhat similar to the stable remanence states of magnetic materials, when subjected to electric fields of opposite polarities and, as a consequence, are readily adapted for use as binary storage elements. As storage elements, these materials exhibit characteristics that render them usable over a greater temperature range than that of ferromagnetic cores and, for example, have been found to be usable over a range greater than −55° C. to 125° C. The further characteristic of ferroelectric capacitors is the piezoelectric property, or characteristic, of changing dimensions in response to potentials applied across the terminals of the capacitor and, conversely, of producing a voltage differential between the terminals in response to mechanical pressures exerted between the opposing faces of the capacitor.

U.S. patent application, Ser. No. 523,223, filed Feb. 14, 1966, discloses a memory device incorporating ferroelectric capacitors. The memory device disclosed therein includes a pair of substantially flat, ferroelectric capacitor plates, one serving as a drive plate and the other as a memory plate. A layer of conductive material is interposed between the two plates. The plates are secured together in such a manner, as by an electrically conductive bond or by heat fusing, so that the drive plate may transmit mechanical forces to the memory plate in directions acting both laterally and perpendicularly of the plane defined by the memory plate, so as to thereby mechanically stress the memory plate. The drive plate is permanently prepolarized and the memory plate is polarized either negatively or positively by application of an electric potential between its opposing flat surfaces, so that it stores binary information, i.e., polarized negatively or positively. When an interrogating readout voltage is applied between opposing surfaces of the drive plate, its dimensions change in directions extending laterally and perpendicularly of its plane, which forces act to also mechanically stress the memory plate which develops an output signal dependent on its state of polarization. This output signal has a duration substantially that of the applied interrogating readout voltage. If the readout voltage is of a polarity opposite to the direction of polarization of the drive plate, then the magnitude of the interrogating readout voltage is kept well below the polarization threshold voltage, i.e., the voltage required to permanently polarize the drive plate, so that the readout process is nondestructive and can be interrogated indefinitely without need for an automatic rewrite cycle, as is normally required in destructive readout memory devices.

In addition to the single bit memory devices, described above, application, Ser. No. 523,223 also discloses a memory matrix having several word lines, each having associated therewith more than one bit. This memory matrix includes one driver plate for each word line having a plurality of ferroelectric memory plates secured thereto to define a plurality of bits. Similarly, application, Ser. No. 640,717 discloses a memory matrix having several word lines, each having associated therewith more than one bit. In this matrix, however, a single drive plate and a single memory plate are secured together as a monolithic construction, in which several word lines, each having several memory bits, are defined. Each bit, for example, is defined in a portion of the memory plate taken between two conductive strips on opposite surfaces of the memory plate.

It is particularly desirous that minimum structure and time be required to program or write a memory matrix. Thus, such a matrix may include eight word lines, each having eight bits defined therein, for a total of sixty-four bits. The structure and time required to correctly program all of the bits of such a matrix, one at a time, would be extremely complex. Further, in order to reduce the size of the matrix, a monolithic construction, of the nature disclosed in application, Ser. No. 640,717, may be desired. In such case, it would be extremely difficult to program each of the bits, if programmed one at a time. Accordingly, whether a matrix takes the form of a plurality of discrete memory cells, or separate word lines each having discrete memory plates mounted thereon, or a monolithic construction, it is desirable to provide a relatively easy manner of programming the matrix so that the correct pattern of binary signals may be stored therein.

The present invention is directed toward satisfying the foregoing needs of easily programming a ferroelectric capacitor matrix so that the desired pattern of binary signals may be stored in the matrix with minimum structure and programming time.

The present invention contemplates the provision of a ferroelectric capacitor matrix having a plurality of rows and columns, each including a plurality of ferroelectric memory means having first and second oppositely facing surfaces.

In accordance with the invention, the improvement for storing binary signals, as desired, in the matrix comprises: an electrically conductive bit line associated with each column and being electrically connected to a first surface of each memory means in that column; an electrically conductive common line associated with each row and being electrically connected to a second surface of each memory means in that row; a voltage supply means for providing direct current voltage levels V1, V2, V3 and V4 of values selected so that $+Vp=V1-V4$ and $$-Vp=V2-V3$$

where V$p$ is the polarization voltage required between the first and second surfaces to polarize a memory means for storing a binary signal; a bit line switching means coupled with an associated bit line for selectively applying voltage level V1 or V2 to the first surface of each memory means in the associated row; and, a common line drive means coupled with an associated common line for applying voltage levels V3 and V4, at different points in time, to the common line whereby the memory means in the associated row become polarized positively or negatively.

In accordance with another aspect of the present invention, a method is provided for storing binary signals in a ferroelectric capacitor matrix, which includes the steps of applying voltage level V1 to the first surface of each memory means in a given row which is to store a binary "1" signal, applying voltage level V2 to the first surface of each memory means in the same given row which is to store a binary "0" signal; and, at respectively different points in time, momentarily applying voltage levels V3 and V4 to all of the memory means in that given row which are to store a binary signal, whereby each memory means in that given row becomes positively or negatively polarized to store binary "1" or binary "0" signals, dependent upon whether voltage level V1 or V2 was applied to its first surface.

The primary object of the present invention is to provide apparatus and method for easily and quickly programming a ferroelectric capacitor matrix having several memory bits.

A still further object of the present invention is to provide apparatus and method for easily programming the ferroelectric capacitor matrices constructed in accordance with United States patent applications, Ser. Nos. 523,223 and 640,717.

A still further object of the present invention is to provide programming apparatus for a ferroelectric capacitor matrix, which apparatus includes bilevel switching means for applying various levels of direct current voltage, at different points in time, to one of the surfaces of a ferroelectric capacitor.

A still further object of the present invention is to provide circuitry which is relatively simple for manufacture and economical in use for programming ferroelectric capacitor matrices.

The foregoing and other objects and advantages of the invention will become apparent from the following description of the preferred embodiments of the invention as read in connection with the accompanying drawings in which.

BACKGROUND DISCUSSION

Figure 1:
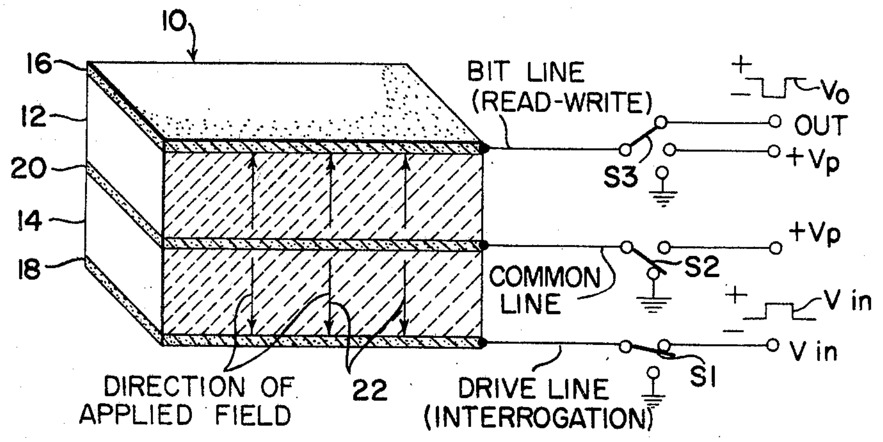
FIG. 1 is a schematic illustration of a ceramic memory single bit construction, illustrating the principles upon which the present invention is based.

Before describing the preferred embodiments of the invention, attention is directed toward the following description of a single bit memory device constructed in accordance with the teachings of U.S. patent application, Ser. No. 523,223. As shown in FIG. 1, that structure includes a single bit ceramic memory device 10, which generally comprises a memory plate 12 constructed of ferroelectric material, such as barium titanate, Rochelle salt, lead metaniobiate or lead titanate zirconate composition, for example. In its preferred form, however, memory plate 12 is constructed of lead titanate zirconate composition since it is easy to polarize. Drive plate 14 is preferably constructed of ferroelectric material having piezoelectric characteristics, such as lead titanate zirconate composition. However, the drive plate may be constructed of any material that will change its dimensions upon application of an electric signal, such as, for example, magnetostrictive material which upon application of current thereto will undergo physical dimension changes. Drive plate 14 is permanently polarized and need not be constructed of easily polarizable material, such as lead titanate zirconate composition.

Plates 12 and 14 are, in their unstressed condition, approximately flat, and are oriented so as to be in substantial superimposed parallel relationship. The upper surface of plate 12 is coated with an electrically conductive layer 16, and the lower surface of plate 14 is coated with an electrically conductive layer 18. Layers 16 and 18 may be of any suitable electrically conductive material, such as silver. Interposed between facing surfaces of plates 12 and 14 there is provided a third layer 20 of electrically conductive material. Layer 20 may be constructed of a conductive epoxy, such as epoxy silver solder, so that facing surfaces of plates 12 and 14 are electrically connected together as well as mechanically secured together. In this manner, as will be described below, when drive plate 14 is stressed it, in turn, transmits mechanical forces to plate 12, so as to mechanically stress plate 12 in directions acting both laterally and perpendicularly of its plane.

Drive plate 14 may be permanently polarized by applying an electric field across its opposing flat surfaces. Thus, as shown in FIG. 1, layer 18 is electrically connected to a single pole, double throw switch S1 which serves to connect layer 18 with either an electrical reference, such as ground, or to an interrogating readout voltage source $V_{in}$. Similarly, layer 20 is connected with the single pole, double throw switch S2. Switch S2 serves to connect layer 20 with either an electrical reference, such as ground, or to a source of polarizing voltage, +V$p$. Plate 14 may now be polarized by connecting layer 20 with the +V$p$ voltage and layer 18 to ground potential. Thus, an electrical field of sufficient magnitude to polarize plate 14 is applied across the opposing faces of the plate. The direction of the electric field is indicated by arrows 22. Thereafter, switches S1 and S2 may be returned to positions as shown in FIG. 1 for a subsequent readout operation.

Binary information may be stored in memory plate 12 by applying an electric field between the opposing faces of the plate in either one of two directions, so that the plate stores either a binary "1" or a binary "0" signal. Layer 16 is connected to a single pole switch S3. Switch S3 serves to connect layer 16 with either a ground potential, or a +V$p$ source of polarizing potential, or to an output circuit OUT. When it is desired to store a binary "1" signal in memory plate 12, switches S2 and S3 are manipulated so that +V$p$ potential is applied to layer 16 and ground potential is applied to layer 20. As shown in FIG. 1, however, memory plate 12 stores a binary "0" signal, which results from having applied +V$p$ potential to layer 20 and ground potential to layer 16.

With switches S1, S2 and S3 in the positions shown in FIG. 1, an interrogating input voltage $V_{in}$ is applied to layer 18. If the applied voltage $V_{in}$ is of a polarity opposite to the direction of polarization of the drive plate, then the magnitude of this interrogating voltage is kept well below the polarization voltage threshold, i.e., the voltage required to permanently polarize drive plate 14, so that the readout process is nondestructive. Application of the readout voltage pulse causes the drive plate to contract or expand in the direction dependent on its prepolarization, as well as the polarity of the applied readout voltage pulse. The direction of contraction or expansion will be both laterally and perpendicularly of the plane defined by plate 14. Since plates 12 and 14 are bonded together, as by the layer 20 of conductive epoxy, any change in physical dimensions of plate 14 will cause corresponding changes in physical dimensions of plate 12. When the memory plate is thus stressed, it develops a voltage which appears between layers 16 and 20, with the polarity at layer 20 being positive or negative, dependent on the state of prepolarization of the memory plate, as well as the direction of mechanical stress. Thus, with reference to FIG. 1, the output voltage V*o* will be a negative pulse representative that a binary "0" signal is stored by plate 12. For a further description of a ceramic memory device as shown in FIG. 1, reference should be made to U.S. patent application, Ser. No. 523,223.

CERAMIC MEMORY MATRIX

Figure 2:
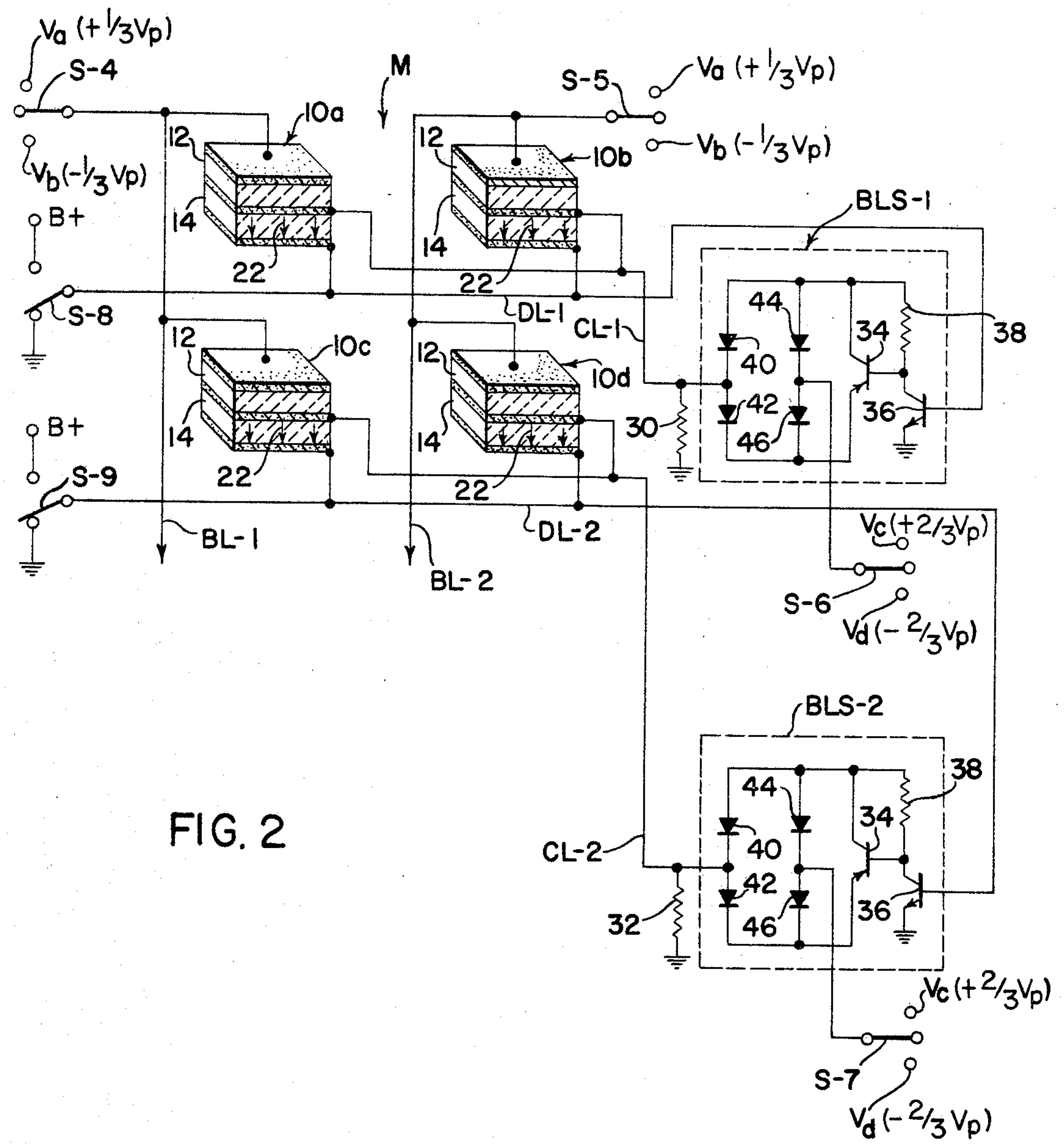
FIG. 2 is a schematic illustration of a ferroelectric capacitor matrix together with circuitry constructed in accordance with the present invention for programming and interrogating the matrix.

Having now described the single bit ceramic memory device, together with the manner in which binary information is stored and interrogated, reference is now made to the ceramic memory matrix M of FIG. 2. For purposes of simplification, this matrix is shown as including only four ceramic memory devices 10*a*, 10*b*, 10*c*, 10*d*, each corresponding with the single bit ceramic memory device 10 illustrated in FIG. 1. These four memory devices are arranged in two vertical columns and two horizontal rows; to wit, a first column includes devices 10*a* and 10*c*, a second column includes devices 10*b* and 10*d*, a first row includes devices 10*a* and 10*b*, and a second row includes devices 10*c* and 10*d*.

FIRST EMBODIMENT

In accordance with the present invention, a common bit line BL–1 is electrically connected to the upper surface of memory plates 12 of the ceramic memory devices 10*a* and 10*c*. A second common bit line BL–2 is electrically connected to the upper surfaces of memory plates 12 of ceramic memory devices 10*b* and 10*d*. Bit line BL–1 is also connected to a three position switch S–4 for respectively applying to the bit line either an open circuit potential, a first direct current voltage level V*a* or a second direct current voltage level V*b*. In accordance with this embodiment of the invention, voltage level V*a* is equal to +⅓ V*p*, where V*p* is the value of the polarization potential required to polarize a memory plate 12. Also, voltage level V*b*, in this embodiment of the invention, is equal to −⅓ V*p*. Similarly, bit line BL–2 is also connected to a three position switch S–5 for selectively connecting bit line BL–2 with either an open circuit potential or direct current voltage level V*a* or direct current voltage level V*b*.

Also, in accordance with this invention, a common line CL–1 is electrically connected to the lower surface of memory plates 12 in the ceramic memory devices 10*a* and 10*b*. Similarly, a common line CL–2 is electrically connected to the lower surfaces of memory plates 12 in memory devices 10*c* and 10*d*. Resistors 30 and 32 are respectively connected between ground and common lines CL–1 and CL–2.

Common lines CL–1 and CL–2 are respectively coupled to bilevel switch circuits BLS–1 and BLS–2. These circuits are identical and each includes a PNP transistor 34, an NPN transistor 36, a resistor 38, and four diodes 40, 42, 44 and 46. Diodes 40 and 42 are connected together in series across the collector to emitter circuit of transistor 34. The junction between diodes 40 and 42 is connected to the common line CL–1 for circuit BLS–1, or to common line CL–2 for circuit BLS–2. Also, diodes 44 and 46 are connected together in series across the collector to emitter circuit of transistor 34. The junction of diodes 44 and 46 is coupled to a three position switch S–6 for circuit BLS–1, or to a three position switch S–7 for circuit BLS–2. Resistor 38 is connected across the base to collector circuit of transistor 34 and thence to the collector of transistor 36. The emitter of transistor 36 is connected to ground. Each of the three position switches S–6 and S–7 may be manipulated to connect its associated bilevel circuit with either a voltage level V*c* or a voltage level V*d* or to an open circuit potential. Voltage levels V*c* and V*d*, in this embodiment of the invention, are respectively equal to +⅔ V*p* and −⅔ V*p*.

In this embodiment of this invention, common line CL–1 is also electrically connected to the upper surfaces of driver plates 14 of memory devices 10*a* and 10*d*, by means of the electrically conductive epoxy 20 between plates 12 and 14. Similarly, common line CL–2 is electrically connected to the upper surfaces of driver plates 14 of memory devices 10*c* and 10*d*. A drive line DL–1 is electrically connected to the lower surfaces of driver plates 14 of memory devices 10*a* and 10*b*, as well as to the base of transistor 36 in the bilevel switch circuit BLS–1. Drive line DL–1 is also connected to a switch S–8 for selectively connecting the drive line with either ground potential or B+ potential. Similarly, drive line DL–2 is electrically connected to the lower surfaces of drive plates 14 of memory devices 10*c* and 10*d*, as well as to the base of transistor 36 in the bilevel switch circuit BLS–2. Drive line DL–2 is also connected to a switch S–9 for selectively connecting the drive line with either ground potential or B+ potential. The drive plates 14, in this embodiment of the invention, are all shown as having been previously polarized in accordance with the direction of the arrows 22, as by use of the circuitry shown in FIG. 1. The description which follows relates to the manner in which binary signals are stored in the memory plates of memory devices 10*a*, 10*b*, 10*c* and 10*d*.

OPERATION

To apply a binary signal for storage in one of the memory plates, a polarizing potential V*p* must be applied between the upper and lower surfaces of a memory plate 12. As discussed with respect to FIG. 1, a binary "1" signal is stored by a positive polarizing voltage and a binary "0" signal is stored by a negative polarizing voltage. By a positive polarizing potential it is meant that the direction of the applied electric field is from the upper surface to the lower surface of a memory plate 12. The opposite is true for a negative polarization potential. For purposes of discussion, it may be assumed that the desired pattern of binary signals to be stored in matrix M is a binary "0" signal in device 10*a*, a binary "1" signal in device 10*b*, a binary "1" signal in device 10*c* and a binary "0" signal in device 10*d*. In the operation of the circuitry, the binary signals for a given row will be written at the same time, and then the binary signals in the second row will be written. Since a binary "0" signal is to be stored by memory device 10*a*, switch S–4 is manipulated to apply voltage level V*b* to bit line BL–1. (Had it been desired to apply a binary "1" signal switch S–4 would have been connected to apply voltage level V*a* to bit line BL–1.) Similarly, since a binary "1" signal is to be stored by memory device 10*d*, switch S–5 is manipulated to apply voltage level V*a* to bit line BL–2. Switch S–8 is maintained in the position as shown in FIG. 2.

At this point in time, switch S–6 is manipulated to apply a third voltage level V*c* to the bilevel switch circuit BLS–1. Thereafter, switch S–8 is manipulated to apply B+ potential over drive line DL–1 to the base of transistor 36 in bilevel circuit BLS–1. Thus, transistor 36 as well as transistor 34 become forward biased. Current now flows from the source of voltage level V*c* through diode 46, the emitter to collector circuit of transistor 34, and, thence, through diode 40 to develop a voltage across resistor 30 on the order of the potential V*c*. Accordingly, the potential applied to lower surfaces of memory plates 12 in devices **10*a* and 10*b*** is a potential of substantially V*c*. The voltage difference between the upper and lower surfaces of memory plate 12 of memory device **10*a*** is equal to *Vb*—*Vc*, or —V*p*. Accordingly, a negative polarization potential has been applied to between the upper and lower surfaces of plate 12 of memory device **10*a*. This polarization potential, as indicated by the polarity thereof, provides an electric field with its direction being from the lower surface to the upper surface of plate 12. This, then, is the condition discussed above for a negatively polarizing plate 12** so that a binary "0" signal is stored.

With switch S–6 being connected to apply voltage level V*c* to the bilevel switch circuit BSL–1, the voltage difference between the upper to lower surfaces of plate 12 in memory device **10*b*** is equal to *Va*—*Vc*, or —⅓ V*p*. Thus, this potential is only on the order of ⅓ that required to polarize the memory plate. In addition, this potential is of insufficient magnitude to destroy any binary signals that might have been previously stored in plate 12 of device **10*b* from a previous write operation. From the foregoing it is seen that we have now stored a binary "0" signal in plate 12 of memory device 10*a*, but have as yet to store a binary "1" signal in plate 12 of memory device 10*b***.

Switch S–6 is now manipulated to apply voltage level V*d* to bilevel switch BLS–1. Again, switch S–8 is manipulated to apply B+ potential to drive line DL–1 so as to forward bias transistors 36 and 34 into conduction. Accordingly, voltage level V*d* is now applied to the lower surfaces of plates 12 in memory devices **10*a* and 10*b*. The voltage difference between the upper and lower surfaces of plate 10*a*** is shown *Vb*—*Vd*, or +⅓ V*p*. This potential, as discussed above, is of insufficient magnitude to either polarize plate 12 or to destroy the previously stored binary "0" signal. The potential difference between the upper and lower surfaces of plate 12 in memory device **10*b*** is now *Va*—*Vd, or* +V*p*. Accordingly, a binary "1" signal is now stored in plate 12 of memory device **10*b*. Switches S–4, S–5, S–6 and S–8 are returned to the positions as shown in FIG. 2. By the previous operational steps, the desired pattern of binary signals has been stored in memory devices 10*a* and 10*b*. This same operation is now repeated for applying the desired pattern of the binary signals to memory devices 10*c* and 10*d***.

After the desired pattern has been applied to the memory devices and all the switches are returned to the positions shown in FIG. 2, the circuitry is in condition for applying interrogation signals to matrix M. The first row is interrogated by merely manipulating switch S–8 to apply B+ potential to driver line DL–1. This B+ potential is the same potential $V_{in}$, shown in FIG. 1, and discussed hereinbefore with respect to the interrogation of memory device 10. Accordingly, memory devices **10*a* and 10*b* provide output signal on bit line BL–1 and bit line BL–2, in accordance with the polarity of the binary signals stored therein. The next row, which includes memory devices 10*c* and 10*d*, is then interrogated by manipulating switch S–9 to apply B+ potential to drive line DL–2** in the same manner as discussed above.

SECOND EMBODIMENT

Figure 3:
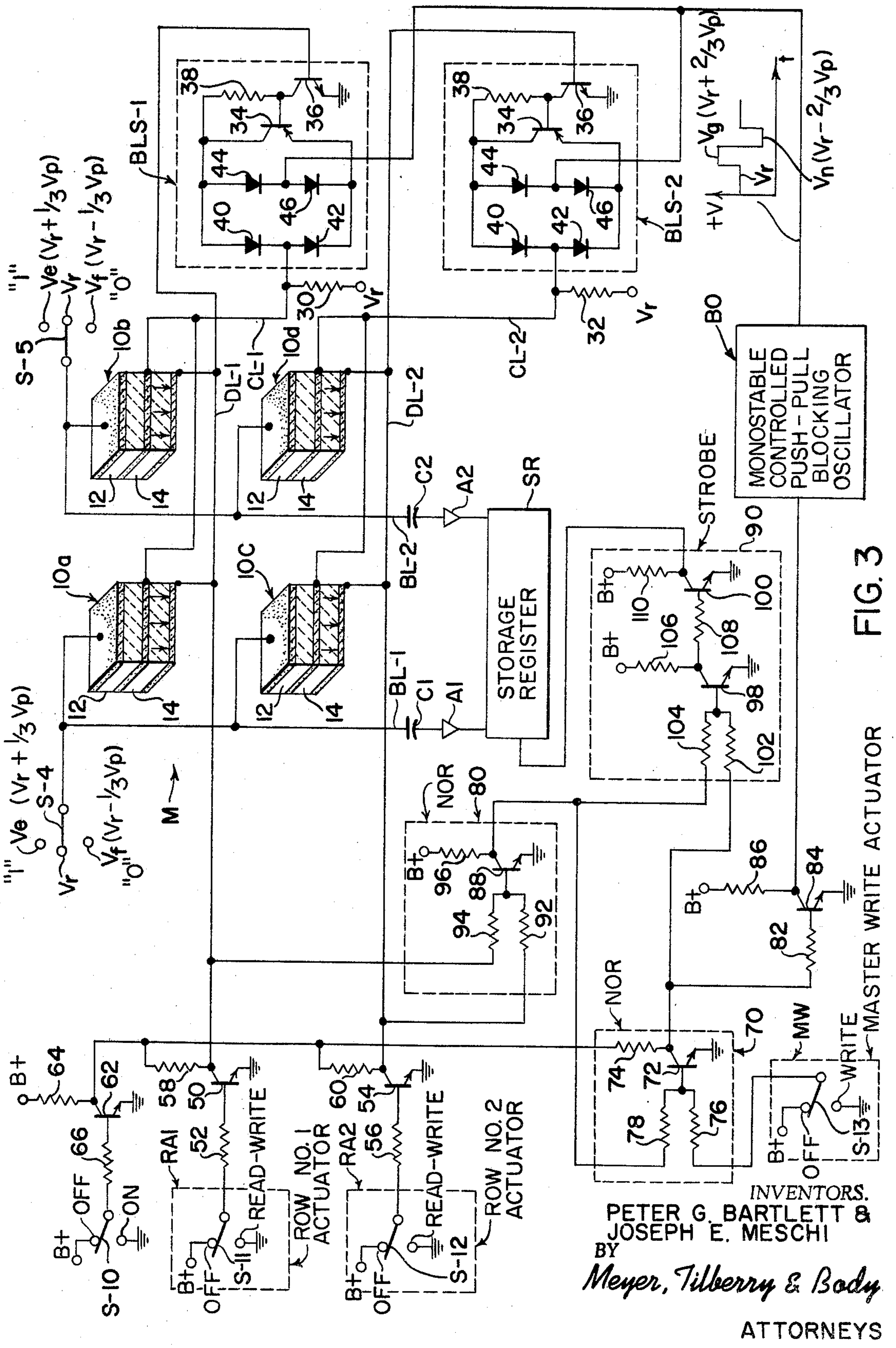
FIG. 3 is a schematic illustration of a second embodiment of the invention; and, FIG. 4 is a schematic illustration of a monostable controlled push-pull blocking oscillator used in conjunction with the embodiment of the invention shown in FIG. 3.

Referring now to FIG. 3, there is shown a second embodiment of the invention which is similar to that as shown in FIG. 2 and, accordingly, like components in both figures are identified with like character references.

The embodiment shown in FIG. 2 is somewhat simplified for purposes of explaining the theory of the present invention. Of significance is that in FIG. 2 voltage levels V*a* and V*c* are positive direct current voltages, whereas voltage levels V*b* and V*d* are negative voltage levels. This, of course, would require power supply circuitry to provide both the positive and negative potentials. In addition, the circuitry of FIG. 2 incorporates, for purposes of simplification, switches S–6 and S–7.

In some applications it may be desirable to eliminate switches S–6 and S–7 as well as to eliminate the necessity for both positive and negative sources of potential. Accordingly, in accordance with the embodiment of FIG. 3, a monostable controlled, push-pull blocking oscillator BO replaces switches S–6 and S–7 of FIG. 2. The output of oscillator BO is coupled to all of the bilevel switch circuits, BLS–1 and BLS–2. The output of the blocking oscillator BO, the description of operation to be given in detail hereinafter, is a positive voltage and incorporates two voltage levels with respect to a reference voltage V*r*. These levels include voltage level V*g* and voltage level V*h*, as shown by the graph of voltage versus time in FIG. 3. Voltage level V*g* may, for example, be equal to voltage level V*r* plus ⅔ of the value of polarization potential V*p*. Similarly, voltage level V*h* may be equal to the voltage level V*r* less ⅔ of the value of polarization potential V*p*. Thus, for example, if the polarization potential is 120 volts, and the value of this potential is dependent upon the thickness of a memory plate 12 as well as the type of material employed, then with a reference voltage V*r* equal to 104 volts, it is seen that voltage level V*g* is 184 volts and voltage V*h* is 24 volts.

Another modification made by the embodiment of FIG. 3 is that switch S–4 and switch S–5 may be respectively manipulated to connect their associated bit lines BL–1 and BL–2 with either a voltage level V*e* or reference voltage V*r* or voltage V*f*. Voltage level V*e*, for example, may be equal to the reference voltage plus ⅓ of the value of polarization voltage V*p*. Similarly, voltage level V*f* may be equal to the reference voltage less ⅓ the value of the polarization potential V*p*. Accordingly, if the reference voltage is 104 volts and the polarization voltage is 120 volts, then voltage level V*e* is equal to 144 volts and the voltage level V*f* is equal to 64 volts.

In this embodiment of the invention, bit line BL–1 is coupled through a series circuit including capacitor C1 and bit line amplifier A1 to a storage register SR. Similarly, bit line BL–2 is coupled through a series circuit including capacitor C2 and bit line amplifier A2 to the storage register SR. The storage register SR may take any suitable form, such as a temporary storage register.

In FIG. 3, a pair of row actuators RA1 and RA2 are provided for respectively actuating row No. 1, i.e., the row which includes memory devices **10*a* and 10*b*, and row No. 2, i.e., the row that includes memory devices 10*c* and 10*d*. Actuator RA1 includes a two position switch S–11 for connecting the base of an NPN transistor 50 with either B+ potential (off position) or ground potential (read-write position). Switch S–11 is coupled to the base of transistor 50 through a suitable resistor 52. The collector of transistor 50 is connected directly with drive line DL–1. Similarly, actuator RA2 includes a two position switch S–12 which is coupled to the base of an NPN transistor 54 through a resistor 56. The collector of transistor 54 is directly connected with drive line DL–2**.

The collectors of transistors 50 and 54 are respectively connected through resistors 58 and 60 to the collector of an NPN transistor 62. Transistor 62 has its emitter connected to ground and its collector connected through a resistor 64 to a B+ voltage supply source. Also, the base of transistor 62 is coupled through a resistor 66 to a two position switch S–10. Switch S–10 serves to connect resistor 66 with either a B+ potential (off position) or with ground potential (on position).

A master write actuator circuit MW is also included in the embodiment of FIG. 3, and includes a two position switch S–13 for connecting one input of a NOR circuit 70 with either a ground potential (write position) or B+ potential (off position). NOR circuit 70 is an RLT NOR circuit and includes an NPN transistor 72 having its emitter connected to ground and its collector connected through a resistor 74 to the collector of transistor 64. The base of transistor 72 is connected through a resistor 76 to the switch S–13 in master write actuator circuit MW. A second input to the base of transistor 72 is taken through a resistor 78 from the output circuit of another NOR circuit 80. The output of NOR circuit 70 is taken at the collector of transistor 72 and is applied to the input of a strobe circuit 90 as well as through a resistor 82 to the base of an NPN transistor 84. Transistor 84 has its emitter connected to ground and its collector connected through a resistor 86 to a B+ voltage supply source. Also, the collector of transistor 84 is connected to the input of blocking oscillator BO.

NOR circuit 80 is identical to NOR circuit 70 and includes an NPN transistor 88, a pair of input resistors 92 and 94 which are coupled to the base of the transistor. More particularly, resistor 94 connects the collector of transistor 50 with the base of transistor 88 and resistor 92 connects the collector for transistor 54 with the base of transistor 88. The collector of transistor 88 is connected through a resistor 96 to a B+ voltage supply source. The output of NOR circuit 80 is taken at the collector of transistor 88 and is connected both to one input, at resistor 74, of NOR circuit 70 as well as to one input of strobe circuit 90.

Strobe circuit 90 includes a pair of NPN transistors 98 and 100. Transistor 98 is connected in a NOR circuit configuration with one input to its base being taken through a resistor 102 from the collector of transistor 72. The other input to the base of transistor 98 is taken through a resistor 104 from the collector of transistor 88. The collector of transistor 98 is connected through a resistor 106 to a B+ voltage supply source. Transistor 100 has its base connected through a resistor 108 to the collector of transistor 98 and its emitter connected to ground. Also, transistor 100 has its collector connected through a resistor 110 to a B+ voltage supply source. The output of strobe circuit 90 is taken at the collector of transistor 100 and is connected to the storage register SR.

BLOCKING OSCILLATOR

Figure 4:
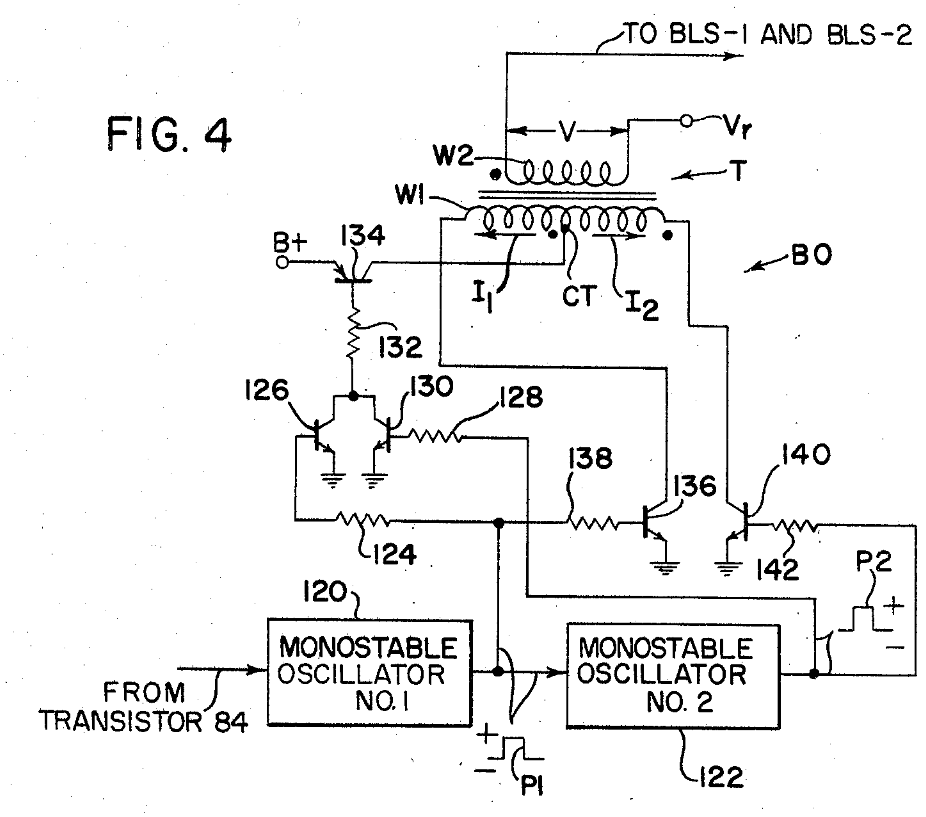

The preferred form of block oscillator BO is shown in FIG. 4, and it includes a pair of series connected monostable oscillators 120 and 122. The input for oscillator 120 is taken from the collector of transistor 84 and the output of oscillator 120 is applied to the input of oscillator 122. The output of oscillator 120 is also connected through a resistor 124 to the base of an NPN transistor 126 having its emitter connected to ground. Similarly, the output of oscillator 122 is connected through a resistor 128 to the base of an NPN transistor 130 having its emitter connected to ground. The collectors of transistors 126 and 130 are connected together in common and thence through a resistor 132 to the base of a PNP transistor 134 having its emitter connected to a B+ voltage supply source. The collector of transistor 134 is connected to a center tap CT on a primary winding W1 of a transformer T. The left end of primary winding W1 is connected to the collector of NPN transistor 136 having its emitter connected to ground and its base connected through a resistor 138 to the output of oscillator 120. Similarly, the right end of winding W1 is connected to the collector of an NPN transistor 140 having its emitter connected to ground and its base connected through a resistor 142 to the output of oscillator 122. The secondary winding W2 of transformer T has its right end connected to the reference voltage source $Vr$ and its left end connected in common to all of the bilevel switch circuits BLS–1 and BLS–2 (see FIG. 3). The transformer windings are connected in accordance with the polarity of the black dots shown in FIG. 4.

The operation of oscillator BO commences when transistor 84 (see FIG. 3) is biased into conduction. As transistor 84 is biased into conduction, a negative going signal is applied from the collector of transistor 84 to oscillator 120. Oscillator 120 is a typical monostable oscillator and, as is well known, serves upon receipt of a negative going signal to provide a positive output pulse P1 (see FIG. 4) of a given magnitude and given duration. Pulse P1 is applied to the base of transistor 126 as well as to the input circuit of monostable oscillator 122. Monostable oscillator 122 does not provide an output pulse P2 until it receives the trailing or negative going edge of pulse P1. In the meantime, pulse P1 serves to forward bias transistor 126 which, in turn, forward biases transistor 134. Accordingly, essentially B+ potential is applied to the center tap CT of winding W1. Pulse P1 also serves to bias transistor 136 into conduction so that essentially ground potential is applied to the left end of winding W1. Thus, for the duration of pulse P1 current flows from the center tap CT through the left half of winding W1 to ground, in accordance with the direction of arrow I1. A voltage V is induced in secondary winding W2 of a polarity in accordance with the black dots shown in FIG. 4. Thus, voltage V adds to voltage $Vr$. The magnitude of voltage V is on the order of ⅔ $Vp$, as determined by such factors as the transformer winding ratio.

On the negative going, or trailing, edge of pulse P1 monostable oscillator 122 is actuated to provide output pulse P2. This pulse forward biases transistors 130 and 140. Also, since transistor 130 is now biased into conduction, transistor 134 becomes conductive to apply essentially B+ potential to the center tap CT. Since transistor 140 is also forward biased it essentially applies ground potential to the right end of winding W1. Accordingly, current flows, during the duration of pulse P2, through the right half of winding W1 in accordance with the direction of arrow I2. The induced voltage V in the secondary winding W2 will subtract from the reference voltage $Vr$. From the foregoing discussion, it is seen that each time transistor 84 is biased into conduction a train of two pulses $Vg$ and $Vh$ (see FIG. 3) are applied to all of the bilevel switch circuits BLS–1 and BLS–2.

SECOND EMBODIMENT OPERATION

The operation for applying binary signals for storage in matrix M or for interrogating a matrix M is substantially the same as that discussed hereinbefore with reference to FIG. 2. Accordingly, only the deviations from the previous description will be discussed in detail hereinafter. Basically, all of the voltage levels have been raised by the value of reference voltage $Vr$ so that only a positive direct current voltage source is required. If it is desired to store a binary "1" signal in a memory plate 12, then the upper surface of that memory plate should be connected to voltage level $Ve$. If, however, a binary "0" signal is to be stored, the upper surface of a memory plate 12 must be connected with voltage level $Vf$. As will be discussed hereinafter, voltage levels $Vg$ and $Vh$ are applied at different times to the lower surfaces of memory plates 12. If the potential on the upper surface of a memory plate is $Ve$ and the potential on the lower surface is $Vg$, then the potential difference is −⅓ $Vp$, which is not sufficient to polarize the memory plate. However, if the potential on the lower surface is $Vh$ then the potential difference is +$Vp$, which positively polarizes the memory plate to store a binary "1" signal. Similarly, if the potential on the upper surface of a memory plate 12 is $Vf$ and the potential on the lower surface is $Vh$, then the voltage difference is −⅓ $Vp$, which is insufficient to polarize the memory plate. However, if the potential on the lower surface of that memory plate is $Vg$, then the potential difference is −$Vp$ which serves to negatively polarize that memory plate to store a binary "0" signal.

As in the embodiment of FIG. 2, application of binary information to be stored in matrix M is accomplished one row at a time. First, switches S–4 and S–5 are manipulated, as desired, for storage of either binary "1" or binary "0" signals. Then, switch S–10 is manipulated to its "on" position so that transistor 62 is reversed biased. This applies essentially B+ potential to the collectors of transistors 50, 54 and 74. During the write operation of row No. 1, the next step is to manipulate switch S–11 from its "off" position to its "read-write" position. This reverse biases transistor 50 so that the positive potential at its collector is applied as an actuating signal to forward bias transistor 36 in bilevel switch circuit BLS–1. After switch S–11 has been manipulated to its "read-write" position, the operator then manipulates switch S–13 in the master write actuator circuit MW to its "write" position. Since the potential on the collector of transistor 50 is essentially at B+ potential and the potential on the collector of transistor 54 is essentially at ground potential, transistor 88 in NOR circuit 80 is biased into conduction. Accordingly, the potential on the collector of transistor 88 is essentially at ground potential and this potential is applied through resistor 78 in NOR circuit 70 to the base of transistor 72. Since switch S–13 now applies a ground signal through resistor 76 to the base of transistor 72, this transistor is reversed biased and its collector applies essentially a B+ potential to the base of transistor 84. Accordingly, transistor 84 is biased into conduction to energize oscillator BO. The output circuit of blocking oscillator BO carries a train of two voltage pulses respectively of voltage levels V*g* and V*h*. These voltage levels are applied at different times to the bilevel switch BLS–1, which has been actuated into conduction due to the positioning of switch S–11 to the "read-write" position. Accordingly, memory devices 10*a* and 10*b* now become polarized to store binary signals in accordance with positioning of switches S–4 and S–5.

After row No. 1 has been written as discussed above, switch S–11 is returned to its "off" position and switch S–13 is returned to its "off" position. The circuitry is now in condition for applying binary signals to row No. 2. The same steps discussed above are repeated for this operation.

When it is desired to interrogate one of the rows, the associated row actuator switch S–11 or S–12 is manipulated to its "read-write" position. However, during this operation, the master write actuator switch S–13 is left in its "off" position. During the interrogation of row No. 1, switch S–11 is manipulated to its "read-write" position. This reverse biases transistor 50 so that its collector applies essentially a B+ potential to drive line DL–1. Thus, the voltage difference between the upper and lower surfaces of memory plates 14 in row No. 1 is changed by the value of the B+ potential. This potential corresponds with interrogation voltage $V_{in}$, discussed previously with respect to FIG. 1. The output voltages of memory devices 10*a* and 10*b* appear on bit lines BL–1 and BL–2 in accordance with the polarities of the stored binary signals. These output voltages are applied through capacitors C1 and C2 and amplifiers A1 and A2 to the storage register SR. The register is strobed by strobe circuit 90 so that it is gated into conduction to receive these output signals from memory devices 10*a* and 10*b* only during the time that the matrix M is being interrogated. The gating signal to the storage register SR takes the form of a negative going signal. During the interrogation operation of row No. 1, the potential at the collector of transistor 88 of NOR circuit 80 is essentially at ground potential. Since the master write actuator switch S–13 is in its "off" position, the output taken at the collector of transistor 72 of NOR circuit 70 is essentially at ground potential. Accordingly, transistor 98 in strobe circuit 90 is reversed biased so that essentially a B+ forward biasing potential is applied to the base of transistor 100. This causes the potential on the collector of transistor 100 to decrease in a negative direction so that the storage register SR is gated on to receive the binary signals from ceramic memory devices 10*a* and 10*b*. The same procedure as discussed above with reference to interrogating row No. 1 is repeated when interrogating row No. 2.

The invention has been described in connection with particular preferred embodiments, but is not limited to same. Various modifications may be made without departing from the scope and spirit of the present invention as defined by the appended claims.

What is claimed is:

1. A ferroelectric capacitor matrix comprising:

a plurality of ferroelectric capacitor memory means arranged in columns and rows to define a multiword, multibit memory matrix, each said memory means adapted to be polarized in one of two binary stable states by application of a direct current polarizing voltage of a predetermined value between opposing first and second surfaces thereof;

an electrically conductive bit line associated with each column and electrically connected to the first surface of each memory means in that column;

an electrically conductive common line associated with each row and electrically connected to the second surface of each memory means in that row;

a plurality of bit line switching means, each for selectively connecting an associated bit line with either a first level voltage or a second level voltage;

a plurality of common line switching means, each for connecting an associated common line with either a third level voltage or a fourth level voltage;

the values of said first, second, third and fourth level voltages being chosen so that the difference between a first and fourth level voltage and a second and third level voltage is a voltage having a value on the order of said polarizing voltage and is of either a positive or negative polarity, whereby polarizing voltages of either polarity may be applied between opposing surfaces of each of said memory means to store any desired pattern of binary signals in said matrix.

2. A ferroelectric capacitor matrix as set forth in claim 1 wherein each said common line switching means includes actuatable bilevel switching means for, upon actuation, applying either said third level voltage or said fourth level voltage to the associated said common line.

3. A ferroelectric capacitor matrix as set forth in claim 2 including means for actuating said bilevel switching means.

4. A ferroelectric capacitor matrix as set forth in claim 3 wherein each said bilevel switching means includes a normally reversed biased electronic switching means and wherein said actuating means includes, for each row, a row actuator switching means for forward biasing said electronic switching means in an associated bilevel switching means.

5. A ferroelectric capacitor matrix as set forth in claim 4 including actuatable oscillator means for, upon actuation, applying a train of two voltage pulses which are respectively of values corresponding with said third level voltage and said fourth level voltage to all of said bilevel switching means.

6. A ferroelectric capacitor matrix as set forth in claim 5 including a master signal write switching means, for upon actuation, providing a master write signal; and, logic means for actuating said oscillator means to apply said train of pulses only when said master signal write actuatable switching means has been actuated along with an actuation of one of said row actuator switching means.

7. A ferroelectric capacitor matrix as set forth in claim 3 wherein each said memory means has its second surface mechanically secured to a driving means of piezoelectric material so that application of an interrogating voltage to said driving means causes mechanical forces to be transmitted in directions both laterally and perpendicularly of said second surface to said memory means;

and means for applying said interrogating voltage to said driving means.

8. A method for storing binary "1" and binary "0" signals in a multibit, multiword matrix which includes a plurality of ferroelectric capacitor memory means, each having first and second oppositely facing surfaces, and arranged in columns and rows, and comprising the steps of:

providing direct current voltage levels V1, V2, V3 and V4 of values such that $+Vp=V1-V4$ and $$-VP=V2-V3$$

where V$p$ is the polarization voltage required between said first and second surfaces to polarize a said memory means to store a said binary signal of a polarity in accordance with the polarity of voltage V$p$;

applying voltage level V1 to said first surface of all of said memory means in a given row which are to store a binary "1" signal;

applying voltage level V2 to said first surface of all of said memory means in said given row which are to store a binary "0" signal; and, at respectively different points in time, momentarily applying voltage levels V3 and V4 to all of said memory means in said given row that are to store binary signals, whereby each said memory means in said given row becomes positively or negatively polarized to store a binary "1" or a binary "0" signal dependent upon whether voltage level V1 or level V2 was applied to its first surface.

9. A method of storing binary "1" and binary "0" signals as set forth in claim 8 comprising the additional steps of:

removing the application of voltage levels V1 and V2 from the first surfaces of all of the memory means in said given row, applying said votlage levels V1 and V2 to the first surfaces of the memory means in another row in accordance with which of said memory means are to store binary "1" or binary "0" signals, and then applying said voltage levels V3 and V4, at different times, to the second surfaces of said memory means in said another row.

10. In a ferroelectric capacitor matrix including a plurality of rows and columns each including a plurality of ferroelectric capacitor memory means having first and second oppositely facing surfaces, the improvement for storing binary "1" and binary "0" signals, as desired in said memory means and comprising:

an electrically conductive bit line associated with each column and adapted to be electrically connected to the first surface of each memory means in said column;

an electrically conductive common line associated with each row and adapted to be electrically connected to the second surface of each memory means in said row;

voltage supply means providing direct current voltage levels V1, V2, V3 and V4 of values selected so that $+Vp=V1-V4$ and $-Vp=V2-V3$, where V$p$ is the polarization voltage required between said first and second surfaces to polarize a said memory means to store a said binary signal;

each said bit line being coupled to a bit line switching means for selectively applying voltage level V1 or voltage level V2 to the first surfaces of the memory means in the associated column; and, each said common line being coupled with a common line drive means for applying voltage levels V3 and V4, at different points in time, to said common line, whereby all of said memory means in the associated row become polarized positively or negatively.

11. In a ferroelectric capacitor matrix as set forth in claim 10 wherein each said common line drive means includes actuatable bilevel switching means for, upon actuation, applying said voltage levels V3 and V4 to said common line, and means for actuating said bilevel switching means.

12. In a ferroelectric capacitor matrix as set forth in claim 11 including oscillator means for providing a train of two consecutive voltage pulses of voltage levels V3 and V4, respectively, said oscillator means being coupled to all of said bilevel switching means so that only an actuated one of said bilevel switching means applies said voltage levels to its associated common line.

References Cited

UNITED STATES PATENTS 3,015,090 12/1961 Landauer ---------- 340—173.2

TERRELL W. FEARS, Primary Examiner